United States Patent
Wu et al.

(10) Patent No.: US 12,546,495 B2
(45) Date of Patent: Feb. 10, 2026

(54) AIR CONDITIONING SYSTEM AND METHOD FOR DETECTING A REFRIGERANT LEAK

(71) Applicant: Delta Electronics, Inc., Taoyuan (TW)

(72) Inventors: Kuan-Lung Wu, Taoyuan (TW);
Siang-Lin You, Taoyuan (TW);
Jian-Jhang Wu, Taoyuan (TW);
Pin-Yao Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 205 days.

(21) Appl. No.: 18/529,733

(22) Filed: Dec. 5, 2023

(65) Prior Publication Data

US 2024/0247829 A1   Jul. 25, 2024

Related U.S. Application Data

(60) Provisional application No. 63/439,992, filed on Jan. 19, 2023.

(30) Foreign Application Priority Data

Aug. 11, 2023   (CN) .......................... 202311010545.6

(51) Int. Cl.
*F24F 11/36*   (2018.01)
*F24F 140/20*  (2018.01)

(52) U.S. Cl.
CPC ........... *F24F 11/36* (2018.01); *F24F 2140/20* (2018.01)

(58) Field of Classification Search
CPC . F24F 11/36; F24F 2140/20; F25B 2500/222; F25B 2600/0253;

(Continued)

(56) References Cited

U.S. PATENT DOCUMENTS 7,089,088 B2   8/2006  Terry et al.
9,168,315 B1 * 10/2015  Scaringe .................. F24F 11/30
(Continued)

FOREIGN PATENT DOCUMENTS

CN   110895019 B   3/2021
CN   110906505 B   5/2021
(Continued)

OTHER PUBLICATIONS

Extended Search Report of its corresponding EP application No. 23220196.2 (issued on Apr. 29, 2024).

(Continued)

*Primary Examiner* — Henry T Crenshaw
(74) *Attorney, Agent, or Firm* — MUNCY, GEISSLER, OLDS & LOWE, P.C.

(57) ABSTRACT

A detection method for an air-conditioning system includes detecting whether the input power of the compressor of the air-conditioning system is lower than the power threshold. The method includes obtaining the evaporation saturation temperature of the evaporator of the air-conditioning system and obtaining the condensation saturation temperature of the condenser of the air-conditioning system when the input power is lower than the power threshold. When detecting that the evaporation saturation temperature is greater than the condensation saturation temperature, the method includes determining that an abnormal phase change is occurring and operating the compressor in the full-speed mode. The method includes detecting whether the compressor maintains in the full-speed mode for reaching a first predetermined time when the compressor operates in the full-speed mode, and determining that the refrigerant of the air-conditioning system is leaking if the compressor maintains in the full-speed mode for reaching the first predetermined time.

20 Claims, 4 Drawing Sheets

(58) Field of Classification Search
CPC ........ F25B 2700/151; F25B 2700/2116; F25B 2700/2117; F25B 49/005; F25B 49/022
See application file for complete search history.

(56) References Cited

U.S. PATENT DOCUMENTS

| | | | |
|---|---|---|---|
| 2019/0170602 A1* | 6/2019 | Gupte | F25B 49/005 |
| 2020/0240686 A1* | 7/2020 | Yajima | F25B 1/00 |

FOREIGN PATENT DOCUMENTS

| | | |
|---|---|---|
| CN | 110715395 B | 7/2021 |
| CN | 112856716 B | 5/2022 |
| EP | 1691150 B1 | 11/2016 |
| JP | 2004162979 | 6/2004 |
| JP | 2023-515538 | 4/2023 |
| TW | M608186 | 2/2021 |
| WO | WO2021172866 A1 | 9/2021 |

OTHER PUBLICATIONS

Office Action with English Translation of its corresponding JP application No. 2023-206557 (issued on Jun. 11, 2024).
Office Action issued Jul. 22, 2025 in JP Application No. 2023-206557.

\* cited by examiner

AIR CONDITIONING SYSTEM AND METHOD FOR DETECTING A REFRIGERANT LEAK

CROSS REFERENCE TO RELATED APPLICATIONS

This Application claims the benefit of U.S. Provisional Application No. 63/439,992, filed Jan. 19, 2023, and claims priority of China Patent Application No. 202311010545.6, filed on Aug. 11, 2023, the entirety of which are incorporated by reference herein.

BACKGROUND OF THE INVENTION

Field of the Invention

The present invention relates to an air-conditioning system and method for detecting the same, and, in particular, to an air-conditioning system and method for detecting the same in which the refrigerant leakage is determined by detecting the evaporation saturated temperature and the condensation saturated temperature.

Description of the Related Art

As global warming continues to intensify, causing the outdoor ambient temperature to rise day by day, the use of air-conditioning systems is becoming more and more common, and has become an indispensable part of daily life. In particular, outdoor electrical equipment, such as communication power supply systems, needs to rely on air-conditioning systems to maintain the temperature of the electrical equipment during operation and avoid damage to the electrical equipment. These air-conditioning systems maintain the temperature of the electrical equipment within a suitable temperature range by the phase change of the refrigerant. Therefore, when the refrigerant is leaking, the air-conditioning system will not be able to maintain its original performance.

Traditional air-conditioning systems need a pressure sensor to detect whether the gaseous refrigerant in the air-conditioning system is leaking. However, as the outdoor electrical equipment is designed to be modularized, the volume of the air-conditioning systems is also reduced, so that it is difficult to install a pressure sensor in these air-conditioning systems. In addition, installing a pressure sensor will significantly increase the production cost of the air-conditioning system.

Therefore, many air-conditioning systems used in outdoor electrical equipment cannot actively detect a refrigerant leak, and may not reserve space to install other pressure-sensing devices for detection, so users often fail to immediately realize that the refrigerant is leaking, and this can affect the quality of the air-conditioning system. Therefore, how to effectively detect refrigerant leakage in air-conditioning systems in real time and reduce detection costs will become an urgent issue.

BRIEF SUMMARY OF THE INVENTION

An embodiment of the present invention provides a detection method for an air-conditioning system. This includes detecting whether the input power of the compressor of the air-conditioning system is lower than the power threshold. The method includes obtaining the evaporation saturation temperature of the evaporator of the air-conditioning system and obtaining the condensation saturation temperature of the condenser of the air-conditioning system when the input power is lower than the power threshold. The method includes determining that an abnormal phase change is occurring and operating the compressor in the full-speed mode when it is detected that the evaporation saturation temperature is higher than the condensation saturation temperature. The method includes detecting whether the compressor maintains the full-speed mode for reaching a first predetermined time when the compressor operates in the full-speed mode. The method also includes determining that the refrigerant of the air-conditioning system is leaking if the compressor maintains the full-speed mode for reaching the first predetermined time.

An embodiment of the present invention provides an air-conditioning system. The air-conditioning system includes a compressor, a detector, a condenser, an evaporator, an expansion valve, and a controller. The compressor is configured to receive a refrigerant and exert pressure on the received refrigerant. The detector is configured to detect the electrical power of the compressor during operation. The condenser is connected to an output end of the compressor and has a condensation temperature sensor to detect the condensation saturation temperature. The evaporator is connected to the input end of the compressor and has an evaporation temperature sensor to detect the evaporation saturation temperature. The expansion valve is connected to the condenser and the evaporator. The controller is electrically connected to the detector, the condensation temperature sensor and the evaporation temperature sensor. When the controller (using the detector) detects that the electrical power of the compressor during operation is less than a power threshold, and when the evaporation saturation temperature is higher than the condensing saturation temperature, the controller drives the compressor to operate in the full-speed mode. When the detected compressor continues to operate in the full-speed mode within a predetermined period of time, the controller issues a refrigerant leakage warning.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The air-conditioning system and method for detecting the same of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, spatially relative terms, such as "lower," or "bottom," and "upper," or "top," may be used herein to describe one element or feature's relationship to another element or feature as illustrated in the figures. It should be understood that if the figures are turned upside-down, the element located on the "lower" side may become the element located on the "upper" side.

It should be appreciated that although the terms "first" and "second" may be used herein to describe various elements, materials and/or portions, these elements, materials and/or portions should not be limited by these terms. These terms are merely intended to distinguish different elements, materials and/or portions. Accordingly, a first element, material and/or portion discussed as follows may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "about" or "approximately" may be recited herein, and are intended to encompass the circumstances or ranges that are substantially the same and exactly the same. It should be noted that unless specially defined, even if the above terms are not recited in the description, it should be interpreted as the same meaning as the above approximate terms that are recited.

Figure 1:
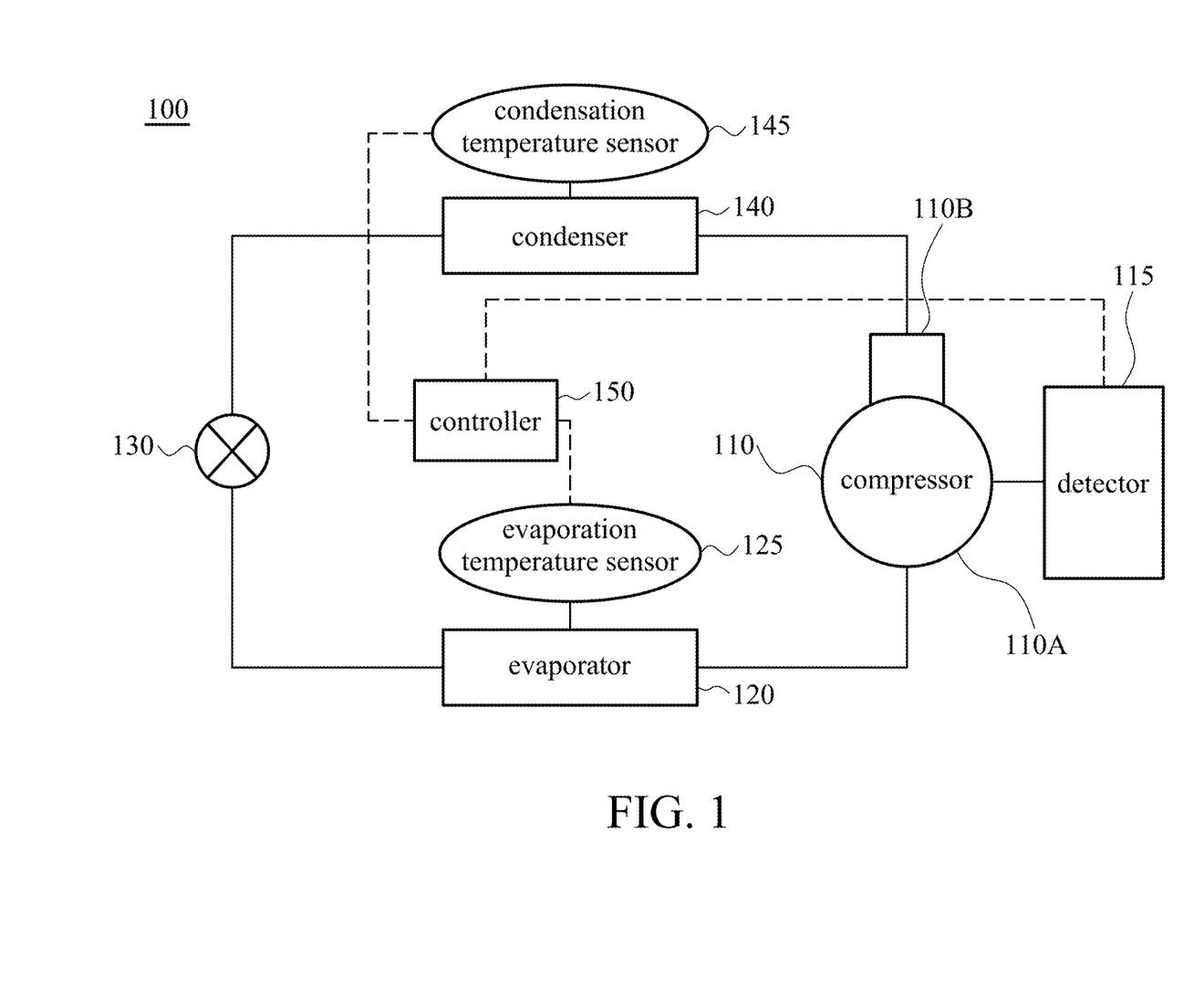
FIG. 1 illustrates a schematic diagram of an air-conditioning system in accordance with some embodiments of the present disclosure.

Please referring to FIG. 1, FIG. 1 illustrates a schematic diagram of an air-conditioning system 100 in accordance with some embodiments of the present disclosure. As shown in FIG. 1, the air-conditioning system 100 includes a compressor 110, an evaporator 120, an expansion valve 130 and a condenser 140. In some embodiments, the condenser 140 is connected to the output end 110B of the compressor 110, and the evaporator 120 is connected to the input end 110A of the compressor 110. In this way, the compressor 110 may be configured to receive the refrigerant (not shown) from the evaporator 120 and exert pressure on the received refrigerant to deliver the refrigerant to the condenser 140 in the form of hot gas. In this embodiment, the detector 115 may be connected to the compressor 110 and is configured to detect the electrical power of the compressor 110 during operation. In addition, the expansion valve 130 is connected to the condenser 140 and the evaporator 120 so that the refrigerant may circulate among the compressor 110, the evaporator 120, the expansion valve 130 and the condenser 140.

In some embodiments, when the refrigerant is in the evaporator 120, the refrigerant may absorb heat energy and evaporate. When the refrigerant is in the condenser 140, the refrigerant may release heat energy and condense. In some embodiments, the evaporator 120 has an evaporation temperature sensor 125 to detect the evaporation saturation temperature of the refrigerant, and the condenser 140 has a condensation temperature sensor 145 to detect the condensation saturation temperature of the refrigerant. In addition, the expansion valve 130 can control the amount of refrigerant flowing into the evaporator 120 to allow a small amount of refrigerant to pass through. As a result, the refrigerant expands and the pressure and temperature of the refrigerant are decreased, thereby effectively controlling the performance of the air-conditioning system 100.

For example, in the case of cooling down a space (i.e., indoor), the evaporator 120 and the expansion valve 130 may be installed in the above space (i.e. installed in an indoor unit), and the compressor 110 and the condenser 140 are installed outside the above-mentioned space (that is, installed in an outdoor unit). In this way, the refrigerant can exchange heat with the indoor air in the evaporator 120, and the refrigerant will evaporate into a gaseous state to cool down the indoor air. The refrigerant evaporated into the gaseous state will be sent to the compressor 110 and the condenser 140 which are located outside. The refrigerant may exchange heat with the outdoor air in the condenser 140, and the refrigerant will condense into a liquid state and discharge heat energy to the outside. The condensed refrigerant will return to the indoor evaporator 120 through the expansion valve 130 to realize the refrigerant circulation and cooling effect of the air-conditioning system 100.

In addition, the air-conditioning system 100 includes a controller 150, which is electrically connected to the detector 115 so as to detect the electrical power of the compressor 110 by the detector 115. In some embodiments, the controller 150 is electrically connected to the evaporation temperature sensor 125 and the condensation temperature sensor 145 to detect the evaporation saturation temperature and the condensation saturation temperature of the refrigerant. When the controller 150 detects that the electrical power of the compressor 110 in operation is less than the power threshold, and the evaporation saturation temperature is higher than the condensation saturation temperature, the controller 150 will drive the compressor 110 to operate in the full-speed mode so as to detect refrigerant leakage. The method for detecting whether the refrigerant leakage occurs in the air-conditioning system 100 will be further described below with reference to FIGS. 3A and 3B.

It should be understood that although the various components of the air-conditioning system 100 are merely schematically illustrated in FIG. 1, the present disclosure is intended to cover various possible actual configurations of components of the air-conditioning system 100. Any configuration that is capable of circulating the refrigerant in the compressor 110, the evaporator 120, the expansion valve 130 and the condenser 140 is included within the scope of the present disclosure.

Figure 2:
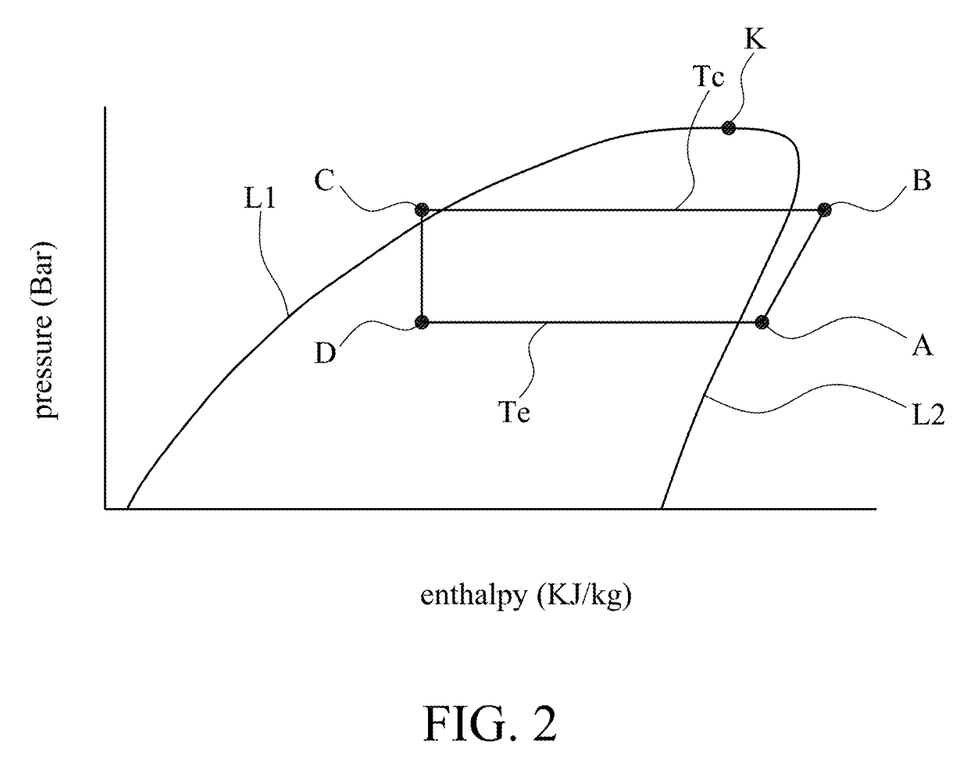
FIG. 2 illustrates a pressure-enthalpy diagram of a refrigerant used in the air-conditioning system in accordance with some embodiments of the present disclosure.

FIG. 2 illustrates a pressure-enthalpy diagram of the refrigerant that is used in the air-conditioning system 100 in accordance with some embodiments of the present disclosure. For example, the refrigerant used in the air-conditioning system 100 is, for example, 1,1,1,2-tetrafluoroethane (also known as R134a refrigerant). However, this embodiment merely serves as an illustrative example, not intended to limit the present disclosure. That is to say, other refrigerants applicable to the air-conditioning system 100 are also feasible, and all possible configurations of refrigerants are included within the scope of the present disclosure. As shown in FIG. 2, the refrigerant has a saturated liquid line L1 and a saturated vapor line L2, and the saturated liquid line L1 and saturated vapor line L2 intersect at the critical point K. Specifically, the left side of the saturated liquid line L1 indicates that the refrigerant is in a liquid state, the right side of the saturated vapor line L2 indicates that the refrigerant is in a gaseous state, and between the saturated liquid line L1 and the saturated vapor line L2 indicates that the refrigerant is undergoing a phase change and is in a gas-liquid coexisting biphasic state. Ideally, the volume ratio of gaseous refrigerant and liquid refrigerant in the condenser 140 and the evaporator 120 is 1:1.

In some embodiments, the refrigerant of the air-conditioning system 100 circulates among points A, B, C, and D. To be more specific, when the refrigerant exits the evaporator 120 and enters the compressor 110, the refrigerant will be in the state shown at the point A. When the refrigerant exits the compressor 110 and is about to enter the condenser 140, the pressure of the refrigerant is increased and the refrigerant will be in the state shown at the point B. When the refrigerant exits the condenser 140 and is about to enter the expansion valve 130, the refrigerant will be in the state shown at the point C. Between the point B and the point C, the refrigerant will change from gaseous state to liquid state, and the temperature of the refrigerant remains constant at this time, and is the condensation saturation temperature Tc which is detected by the condensation temperature sensor 145 (referring to FIG. 1). When the refrigerant exits the expansion valve 130 and enters the evaporator 120, the temperature and pressure of the refrigerant drop and the refrigerant is in the state shown at the point D. At this time, a part of the refrigerant evaporates and the refrigerant enters a two-phase state in which gas and liquid coexist. The remaining refrigerant between the point D and the point A will change from a liquid state to a gas state, and the temperature of the refrigerant will remain constant at this time and is the evaporation saturation temperature Te which is detected by the evaporation temperature sensor 125 (referring to FIG. 1). As a result, under normal circulation, the condensation saturation temperature Tc will be higher than the evaporation saturation temperature Te. Therefore, if the detected evaporation saturation temperature Te is higher than the condensation saturation temperature Tc, it can be determined that the phase change of the refrigerant is abnormal, that is, the refrigerant leakage is likely to occur.

Figure 3A:
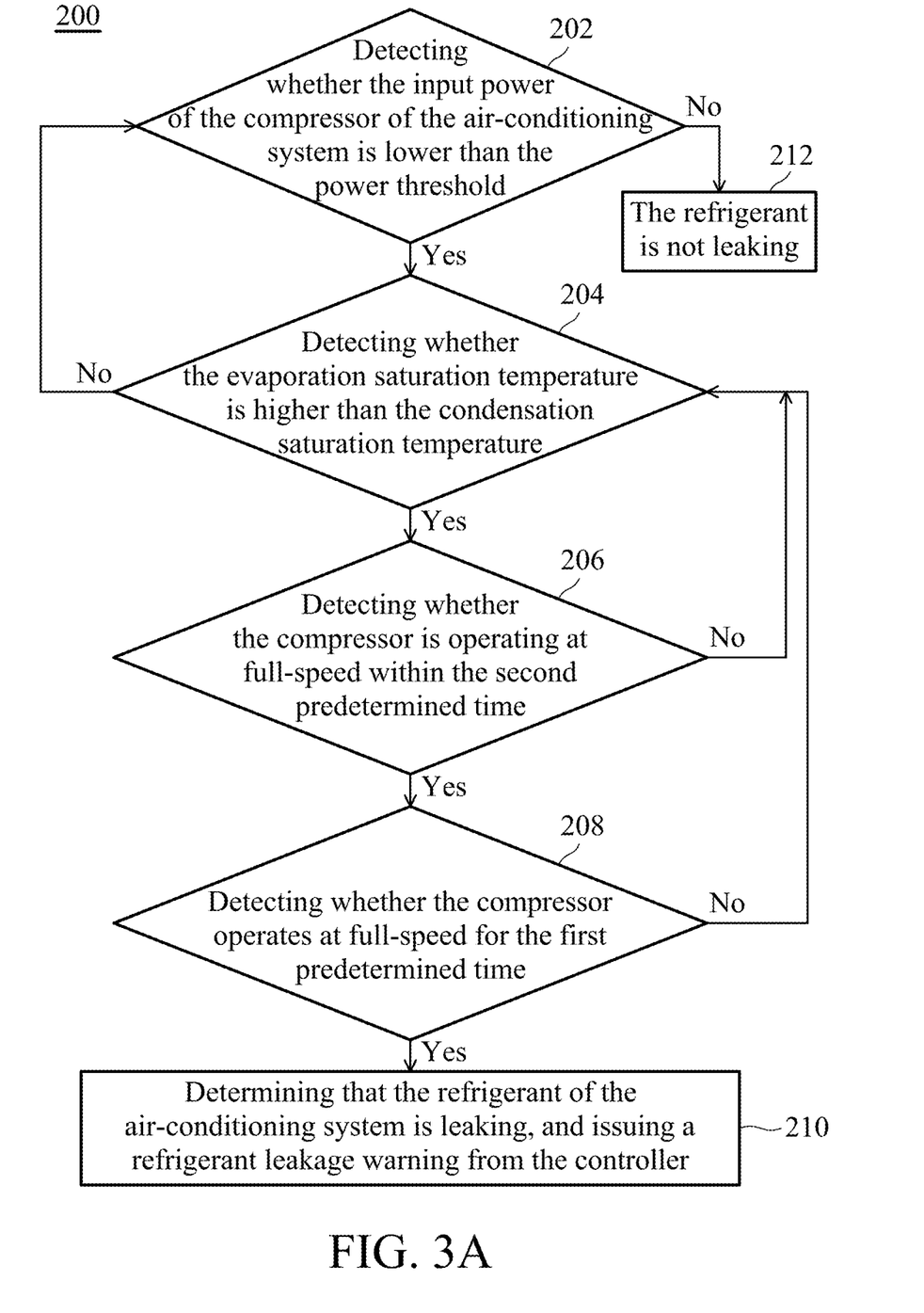
FIG. 3A is a flow chart of a method for detecting the air-conditioning system in accordance with some embodiments of the present disclosure.

FIG. 3A illustrates a flowchart of a method 200 for detecting the air-conditioning system 100 in accordance with some embodiments of the present disclosure. As shown in FIG. 3A, at step 202, for example, the controller 150 instructs the detector 115 to detect whether the input power of the compressor 110 of the air-conditioning system 100 is lower than the power threshold. The power threshold is close to the input power of the compressor 110 at no load, i.e., there is almost no refrigerant in the compressor 110. For example, the aforementioned power threshold may be from about 100 W to about 400 W, but the present disclosure is not limited thereto. Any suitable power threshold is within the scope of the present disclosure. Specifically, a current sensor (not shown) may be disposed on the controller 150 of the air-conditioning system 100. As a result, the input current of the compressor 110 may be detected by the current sensor, and the controller 150 may calculate the input power according to the input current detected by the current sensor. That is, the controller 150 may detect whether the input power of the compressor 110 of the air-conditioning system 100 is lower than the aforementioned power threshold. By detecting whether the input power of the compressor 110 of the air-conditioning system 100 is lower than the power threshold, it can be preliminarily determined whether there is a possibility of refrigerant leakage.

When the detected input power of the compressor 110 is lower than the power threshold, the controller 150 will obtain the evaporation saturation temperature Te of the evaporator 120 of the air-conditioning system 100, and obtain the condensation saturation temperature Tc of the condenser 140 of the air-conditioning system 100. At step 204, when the controller 150 detects that the evaporation saturation temperature Te is higher than the condensation saturation temperature Tc, the controller 150 will determine that an abnormal phase change is occurring in the air-conditioning system 100. Otherwise, when the controller 150 detects that the evaporation saturation temperature Te is not higher than the condensation saturation temperature Tc, the controller 150 instructs the detector 115 to detect whether the input power of the compressor 110 of the air-conditioning system 100 is lower than the power threshold. When an abnormal phase change is occurring in the air-conditioning system 100, the volume ratio of the gaseous refrigerant and the liquid refrigerant in the condenser 140 and the evaporator 120 will not maintain 1:1.

At step 206, after determining that abnormal phase change (that is, the evaporation saturation temperature Te is greater than the condensation saturation temperature Tc) occurs in the air-conditioning system 100, it is detected whether the compressor 110 is operating in the full-speed mode within the second predetermined time. Specifically, the full-speed mode refers to the maximum rotational speed of the compressor 110 when the compressor 110 is at no load. In some embodiments, the second predetermined time is, for example, from 3 minutes to 5 minutes, but the present disclosure is not limited thereto. In some embodiments, if the compressor 110 is operating in the full-speed mode within the second predetermined time, it goes to step 208 to detect whether the compressor 110 operates in the full-speed mode for reaching the first predetermined time. For example, the first predetermined time is, for example, from 10 minutes to 30 minutes, but the present disclosure is not limited thereto. By maintaining the compressor 110 in operation in the full-speed mode for reaching the first predetermined time, the risk of misdetermining refrigerant leakage may be reduced, and before the compressor 110 is kept in operation in the full-speed mode for reaching the first predetermined time, it may be further confirmed whether the evaporation saturation temperature Te is higher than the condensation saturation temperature Tc.

In particular, the internal air pressure of the normal air-conditioning system 100 is usually higher than the atmospheric pressure of the external environment (for example: 1 atmosphere pressure). When a pipe in the air-conditioning system 100 breaks, most of the gaseous refrigerant in the air-conditioning system 100 will leak to the external environment in a short time. Therefore, detecting whether the compressor maintains the maximum rotational speed at no load may determine whether the refrigerant is leaking. However, in order to prevent misdetermination caused by the compressor operating at the maximum speed at no load due to other reasons, it is necessary to further detect whether the compressor maintains the maximum speed at no load for the first predetermined time.

In some embodiments, after the compressor 110 is in operation in the full-speed mode within the second predetermined time, continuously detecting (for example, real-time detecting) whether the evaporation saturation temperature Te is higher than the condensation saturation temperature Tc, until the compressor 110 operates in the full-speed mode for reaching the first predetermined time. In some other embodiments, the controller 150 detects whether the evaporation saturation temperature Te is higher than the condensation saturation temperature Tc at a time interval, and the above time interval is, for example, from 3 minutes to 5 minutes.

Otherwise, when the compressor 110 is not operating in the full-speed mode within the second predetermined time, it returns to step 204 to detect whether the evaporation saturation temperature Te is lower than the condensation saturation temperature Tc. If the detected evaporation saturation temperature Te is lower than the condensation saturation temperature Tc, it is determined that the abnormal phase change is transient. After determining that the abnormal phase change is transient, it returns to step 202 to detect whether the input power of the compressor 110 of the air-conditioning system 100 is greater than the power threshold. If it is detected that the input power of the compressor 110 of the air-conditioning system 100 is greater than the power threshold, it can be determined that there is no refrigerant leakage in the air-conditioning system 100, as shown in step 212. In some embodiments, when the controller 150 detects that the evaporation saturation temperature Te is lower than the condensation saturation temperature Tc, the controller 150 may relief the compressor 110 from the full-speed mode.

At step 208, the controller 150 detects that the compressor 110 is maintained in operation in the full-speed mode for reaching the first predetermined time. If the compressor 110 operates in the full-speed mode for reaching the first predetermined time, the possibility that the abnormal phase change is transient can be ruled out. As a result, it goes to step 210 to determine that the refrigerant of the air-conditioning system 100 is leaking. In some embodiments, after determining that the refrigerant of the air-conditioning system 100 is leaking, the controller may issue a refrigerant leakage warning to remind users of the refrigerant leakage of the air-conditioning system 100. In this way, users can realize that the refrigerant is leaking, and can repair the air-conditioning system 100 in time. In contrast, if the compressor 110 is not operating in the full-speed mode for reaching the first predetermined time, it returns to step 204 to detect whether the evaporation saturation temperature Te is lower than the condensation saturation temperature Tc.

Figure 3B:
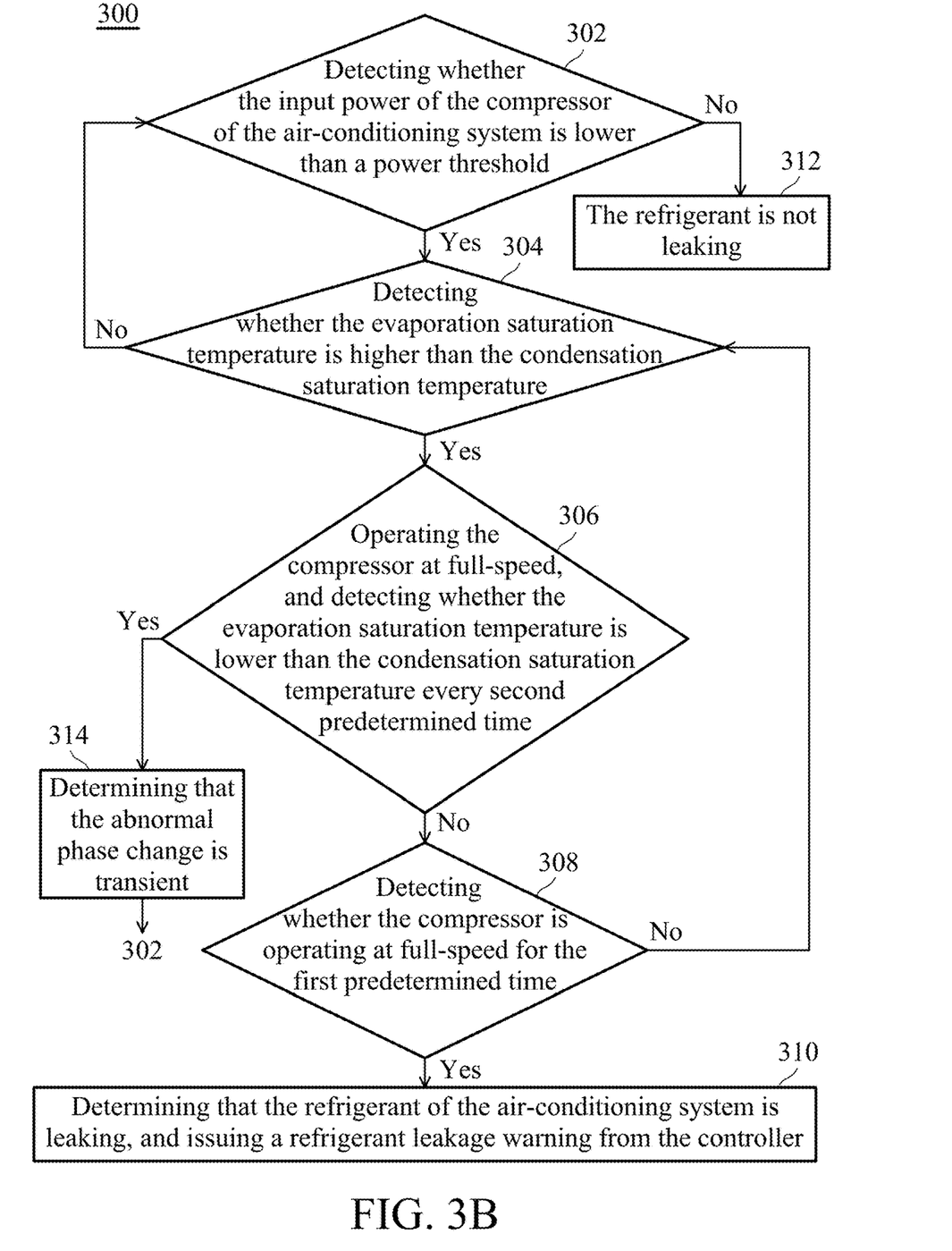
FIG. 3B is a flowchart of a method for detecting the air-conditioning system in accordance with some embodiments of the present disclosure.

FIG. 3B illustrates a flowchart of a method 300 for detecting the air-conditioning system in accordance with some embodiments of the present disclosure. As shown in FIG. 3B, at step 302, for example, the controller 150 instructs the detector 115 to detect whether the input power of the compressor 110 of the air-conditioning system 100 is lower than a power threshold. The power threshold is the input power of the compressor 110 at no load, i.e., there is almost no refrigerant in the compressor 110. For example, the aforementioned power threshold may be from about 100 W to about 400 W, but the present disclosure is not limited thereto. Any suitable power threshold is included within the scope of the present disclosure. Specifically, a current sensor (not shown) may be disposed on the controller 150 of the air-conditioning system 100. In this way, the input current of the compressor 110 may be detected by the current sensor, and the controller 150 may calculate the input power according to the input current detected by the current sensor. Accordingly, the controller 150 may detect whether the input power of the compressor 110 of the air-conditioning system 100 is lower than the aforementioned power threshold. By detecting whether the input power of the compressor 110 of the air-conditioning system 100 is lower than the power threshold, it may be preliminarily determined whether there is a possibility of refrigerant leakage.

When the detected input power of the compressor 110 is lower than the power threshold, the controller 150 will obtain the evaporation saturation temperature Te of the evaporator 120 of the air-conditioning system 100, and obtain the condensation saturation temperature Tc of the condenser 140 of the air-conditioning system 10. At step 304, when the controller 150 detects that the evaporation saturation temperature Te is higher than the condensation saturation temperature Tc, the controller 150 will determine that an abnormal phase change is occurring in the air-conditioning system 100. Otherwise, when the controller 150 detects that the evaporation saturation temperature Te is not higher than the condensation saturation temperature Tc, the controller 150 instructs the detector 115 to detect whether the input power of the compressor 110 of the air-conditioning system 100 is lower than the power threshold. When an abnormal phase change is occurring in the air-conditioning system 100, the volume ratio of the gaseous refrigerant and the liquid refrigerant in the condenser 140 and the evaporator 120 will not remain 1:1.

At step 306, for example, when the compressor 110 is operating in the full-speed mode, it may be detected every second predetermined time whether the evaporation saturation temperature Te is lower than the condensation saturation temperature Tc. If the controller 150 detects that the evaporation saturation temperature Te is lower than the condensation saturation temperature Tc, it can be determined that the abnormal phase change is transient (such as step 314), and it returns to step 302 to continue the above detection steps. Otherwise, if the controller 150 detects that the evaporation saturation temperature Te is higher than the condensation saturation temperature Tc, the compressor 110 is kept in operation in the full-speed mode, and it goes to step 308 to detect whether the compressor 110 is operating in the full-speed mode for reaching the first predetermined time. For example, the first predetermined time is, for example, from 10 minutes to 30 minutes, but the present disclosure is not limited thereto. By keeping the compressor 110 in operation in the full-speed mode for reaching the first predetermined time, the risk of misdetermining refrigerant leakage can be reduced. Before the compressor 110 is kept in operation in the full-speed mode for reaching the first predetermined time, it can be further confirmed whether the evaporation saturation temperature Te is higher than the condensation saturation temperature Tc.

At step 308, the controller 150 detects that the compressor 110 is maintained in operation in the full-speed mode for the reaching first predetermined time. When the compressor 110 is not kept operating in the full-speed mode for reaching the first predetermined time, it returns to step 304 to detect whether the evaporation saturation temperature Te is lower than the condensation saturation temperature Tc. If the detected evaporation saturation temperature Te is lower than the condensation saturation temperature Tc, it is determined that the abnormal phase state change is transient. After determining that the abnormal phase change is transient, it returns to step 302 to detect whether the input power of the compressor 110 of the air-conditioning system 100 is greater than the power threshold. If it is detected that the input power of the compressor 110 of the air-conditioning system 100 is greater than the power threshold, it can be determined that there is no refrigerant leakage in the air-conditioning system 100, as shown in step 312. In some embodiments, when the controller 150 detects that the evaporation saturation temperature Te is lower than the condensation saturation temperature Tc, the controller 150 may relief the compressor 110 from the full-speed mode.

If the compressor 110 operates in the full-speed mode for reaching the first predetermined time, the possibility that the abnormal phase change is transient can be excluded, that is, it goes to step 310 to determine that the refrigerant in the air-conditioning system 100 is leaking. In some embodiments, after determining that the refrigerant of the air-conditioning system 100 is leaking, the controller may issue a refrigerant leakage warning to remind users of the refrigerant leakage of the air-conditioning system 100. In this way, users can realize that the refrigerant is leaking, and can repair the air-conditioning system 100 in time.

In summary, the present disclosure provides an air-conditioning system and a detection method thereof for detecting the evaporation saturation temperature and the condensation saturation temperature to determine refrigerant leakage. Specifically, the controller of the air-conditioning system can detect whether the input power of the compressor of the air-conditioning system is lower than a power threshold, and detect whether the evaporation saturation temperature is higher than the condensation saturation temperature in the air-conditioning system. If the above conditions are both detected at the same time, the compressor may be operating in the full-speed mode for reaching a predetermined time, so that it can be determined that the refrigerant is leaking and the risk of misdetermining the refrigerant leakage may be reduced. In this way, the existing temperature sensor and current sensor can be used along with the temperature determination program to realize the function of allowing users to determine the refrigerant leakage in real time without additional hardware costs, saving the space for setting other components for detecting refrigerant leakage in the air-conditioning system.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A detection method for an air-conditioning system, comprising:
    detecting whether an input power of a compressor of the air-conditioning system is lower than a power threshold;
    obtaining an evaporation saturation temperature of an evaporator of the air-conditioning system, and obtaining a condensation saturation temperature of a condenser of the air-conditioning system when the input power is lower than the power threshold;
    determining that an abnormal phase change is occurring and operating the compressor in a full-speed mode when it is detected that the evaporation saturation temperature is higher than the condensation saturation temperature;
    detecting whether the compressor operates in the full-speed mode for a first predetermined time when the compressor is operating in the full-speed mode; and
    determining that a refrigerant of the air-conditioning system is leaking if the compressor operates in the full-speed mode for the first predetermined time.

2. The detection method for the air-conditioning system as claimed in claim 1, further comprising:
    detecting whether the evaporation saturation temperature is lower than the condensation saturation temperature at a time interval of a second predetermined time when the compressor is operating in the full-speed mode; and
    determining that the abnormal phase change is transient if it is detected that the evaporation saturation temperature is lower than the condensation saturation temperature.

3. The detection method for the air-conditioning system as claimed in claim 2, further comprising:
    after determining that the abnormal phase change is transient, detecting whether the input power of the compressor of the air-conditioning system is greater than the power threshold; and
    determining that the refrigerant of the air-conditioning system is not leaking if it is detected that the input power of the compressor of the air-conditioning system is greater than the power threshold.

4. The detection method for the air-conditioning system as claimed in claim 1, further comprising:
    disposing a current sensor on a controller of the air-conditioning system;
    detecting an input current of the compressor using the current sensor, wherein the controller calculates the input power using the input current detected by the current sensor; and
    detecting whether the input power of the compressor of the air-conditioning system is lower than the power threshold using the controller.

5. The detection method for the air-conditioning system as claimed in claim 2, wherein the second predetermined time is from 3 minutes to 5 minutes.

6. The detection method for the air-conditioning system as claimed in claim 2, wherein the first predetermined time is from 10 minutes to 30 minutes.

7. The detection method for the air-conditioning system as claimed in claim 1, wherein the full-speed mode is a maximum rotational speed of the compressor at no load.

8. The detection method for the air-conditioning system as claimed in claim 1, wherein the power threshold is from 100 W to 400 W.

9. The detection method for the air-conditioning system as claimed in claim 1, further comprising:
    after the compressor is operating in the full-speed mode, continuously detecting whether the evaporation saturation temperature is greater than the condensation saturation temperature until the compressor operates in the full-speed mode for the first predetermined time.

10. The detection method for the air-conditioning system as claimed in claim 1, further comprising:
    after determining that the refrigerant of the air-conditioning system is leaking, a refrigerant leakage warning is issued.

11. The detection method for the air-conditioning system as claimed in claim 1, wherein obtaining the evaporation saturation temperature of the evaporator of the air-conditioning system comprises detecting the evaporation saturation temperature using an evaporation temperature sensor in the evaporator.

12. The detection method for the air-conditioning system as claimed in claim 1, wherein obtaining the condensation saturation temperature of the condenser of the air-conditioning system comprises detecting the condensation saturation temperature using a condensation temperature sensor in the condenser.

13. The detection method for the air-conditioning system as claimed in claim 1, further comprising:
excluding the possibility that the abnormal phase change is transient after the compressor operates in the full-speed mode for the first predetermined time.

14. An air-conditioning system, comprising:
a compressor configured to receive a refrigerant and exert pressure on the received refrigerant;
a detector configured to detect an electrical power of the compressor during operation;
a condenser, connected to an output end of the compressor, having a condensation temperature sensor to detect a condensation saturation temperature;
an evaporator, connected to an input end of the compressor, having an evaporation temperature sensor to detect an evaporation saturation temperature;
an expansion valve connected to the condenser and the evaporator; and
a controller electrically connected to the detector, the condensation temperature sensor and the evaporation temperature sensor, wherein when the controller using the detector detects that the electrical power of the compressor during operation is less than a power threshold, and when the evaporation saturation temperature is higher than the condensing saturation temperature, the controller drives the compressor to operate in a full-speed mode, and when the detected compressor continues to operate in the full-speed mode within a predetermined period of time, the controller issues a refrigerant leakage warning.

15. The air-conditioning system as claimed in claim 14, wherein when the controller detects that the evaporation saturation temperature is lower than the condensing saturation temperature, the controller ends the full-speed mode of the compressor.

16. The air-conditioning system as claimed in claim 14, wherein the controller detects whether the evaporation saturation temperature is higher than the condensation saturation temperature at a time interval, and the time interval is from 3 minutes to 5 minutes.

17. The immersion cooling system as claimed in claim 14, wherein the predetermined time period is from 10 minutes to 30 minutes.

18. The immersion cooling system as claimed in claim 14, wherein the power threshold is from 100 W to 400 W.

19. The immersion cooling system as claimed in claim 14, further comprising a current sensor disposed on the controller, and the current sensor detects an input current of the compressor.

20. The immersion cooling system as claimed in claim 14, wherein the full-speed mode is a maximum rotational speed of the compressor at no load.

* * * * *